FREQUENCY SYNTHESIS

Filed Oct. 6, 1965

United States Patent Office 3,320,547
Patented May 16, 1967

3,320,547
FREQUENCY SYNTHESIS

Richard Thomas Albert Standford, Fareham, and Anthony Poulett, Bognor Regis, England, assignors to The Plessey Company Limited, Ilford, England, a British company Filed Oct. 6, 1965, Ser. No. 493,454
3 Claims. (Cl. 331—40)

This invention relates to improvements in frequency synthesis apparatus.

According to one aspect of the invention we provide a circuit arrangement including a modulator arranged, in use, to be fed with a modulating frequency via a feedback path from the modulator output, the feedback path including a frequency divider arrangement.

The frequency divider arrangement may be variable frequency divider and the modulator may be a balanced modulator.

An input circuit to the modulator may include switching means such that the input for the modulator can be derived from either one of two sources and the output from the modulator may include a band pass filter, the arrangement being such that, in use, when two predetermined different frequencies are derived respectively one from each of the two sources the band pass filter allows passage of the upper side band of the lower frequency and the lower side band of the higher frequency.

A further frequency divider arrangement, which may be a variable frequency divider, may be connected either between the switching means and the modulator or at the output of the modulator, in the latter case the output of the circuit arrangement being derived from the output of the further frequency divider arrangement.

Both the frequency divider arrangements may be digital dividers each having a band pass filter connected at its output, whereby, in use, the rectangular wave output of each divider is converted to a sinusoidal wave.

The foregoing and further features of the invention will become apparent from the following description of a preferred embodiment thereof with reference to the accompanying drawing in which.

Figure 1:
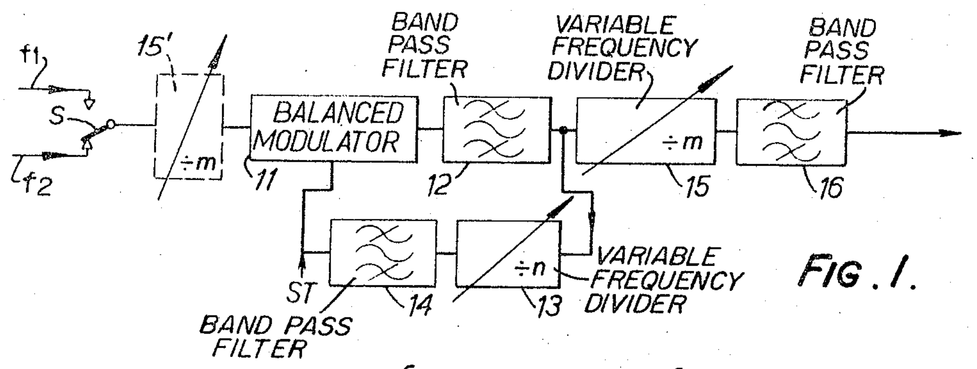
FIGURE 1 shows a block diagrammatic representation of the embodiment.

Referring now to FIGURE 1, there is shown a circuit arrangement including a balanced modulator 11 whose input is derived via a switch S from either one of two sources of different predetermined frequencies $f1$ and $f2$. The output of the balanced modulator 11 is fed via a band pass filter 12 along a feed back loop to provide a modulating frequency input, the feed back loop including a variable digital frequency divider 13 and a band pass filter 14. The output from the band pass filter 12 is also fed via a variable digital frequency divider 15 to a band pass filter 16 whose output is the output for the whole circuit arrangement.

Figure 2:
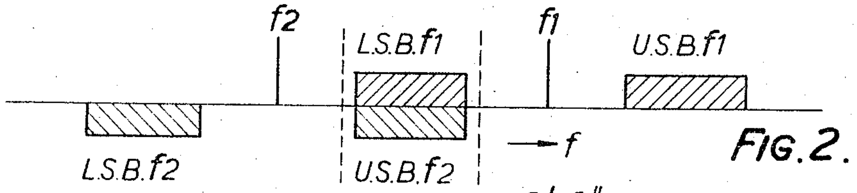
FIGURE 2 shows the respective frequency values of two inputs suitable for use with the circuit of FIGURE 1.

As illustrated in FIGURE 2, it can be seen that frequency $f1$ is arranged to be higher than frequency $f2$ and the frequency values relative to one another are such that the lower side band of frequency $f1$ coincides with the upper side band of frequency $f2$. The band pass filter 12 is arranged to be such that it will pass the band of frequencies in which these coincident upper and lower side bands fall, as shown between the dotted lines in FIGURE 2. The band pass filters 14 and 16 are less than one octave and are provided to convert the digital divider outputs from dividers 13 and 15 respectively, which are of rectangular shape, into sinusoids.

The operation of the circuit arrangement of FIGURE 1 will now be explained with the aid of FIGURES 3 and 4. Upon initial energisation it is necessary to apply a start signal to the input referenced ST to the modulating frequency input of the balanced modulator 11. With switch S in the position shown (to $f2$) in FIGURE 1 and a frequency start signal applied to terminal ST upper and lower side band frequency outputs of frequency $f2$ are fed from the balanced modulator 11 to the band pass filter 12. The upper side band signal of frequency $f2$ passes through the band pass filter 12 into the frequency divider 13 at which point it is divided by an integer $n$ and the dividend frequency thence passes through the filter 14 to the modulating frequency input of balanced modulator 11.

The frequency F appearing at the output of band pass filter 12 is given by the term:

$$f_2+\frac{F}{n}=F$$

where $n$ equals the value of the divisor of divider 13, $$\therefore f_2=F-\frac{F}{n}$$

$$\therefore f_2=F\left(1-\frac{1}{n}\right)$$

$$\therefore F=\frac{f_2}{\left(1-\frac{1}{n}\right)}$$

$$\therefore F=f_2\times\frac{1}{\left(1-\frac{1}{n}\right)}$$

This latter term gives the upper side band value of frequency $f_2$. Similarly it can be shown that the lower side band value of frequency $f1$ is given by the term $$F=f1\times\frac{1}{\left(1+\frac{1}{n}\right)}$$

Hence it can be seen that the frequency value appearing at the output of band pass filter 12 is dependent firstly upon which frequency $f1$ or $f2$ is entering the balance modulator 11 and also upon the value which is given to $n$. Thus by varying the divisor $n$ of the divider 13 and by changing the position of switch S different values of F within the pass band of the filter 12 can be achieved.

The output from the band pass filter 12 also passes via frequency divider 15 and band pass filter 16 to the output of the circuit. The value of the frequency $f_0$ at the output of the circuit for an input of frequency $f2$ to the balanced modulator is given by the term $$F_0=f_2\times\frac{1}{m\left(1-\frac{1}{n}\right)}$$

and the value of the output frequency for an input of the frequency $f1$ to the circuit is given by the term $$F_0=f_1\times\frac{1}{m\left(1+\frac{1}{n}\right)}$$

in both cases $m$ being the integer value by which the frequency is divided in divider 15.

Figure 3:
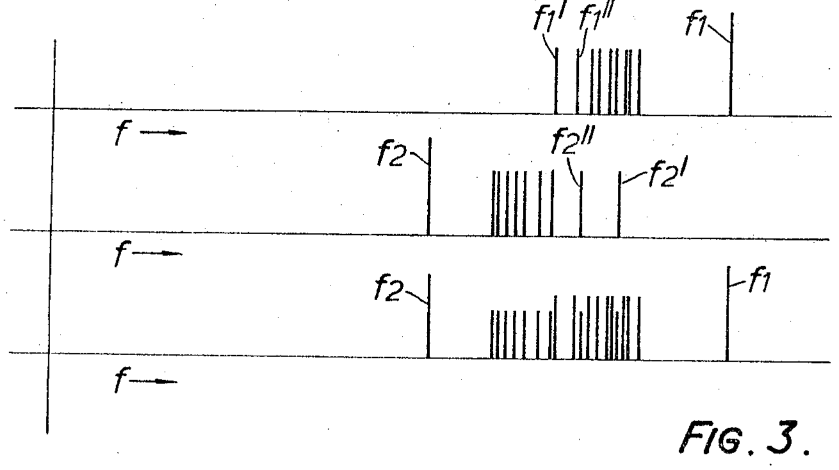
FIGURE 3 shows some of the frequency signals generated at a first point in the circuit of FIGURE 1.
Figure 4:
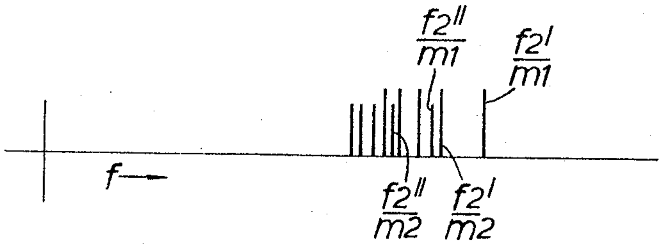
FIGURE 4 shows a portion of the output of the circuit of FIGURE 1.

Referring now to FIGURES 3 and 4, there is shown in graphical form the frequency spectrum provided at different points in the circuit with certain inputs. Referring firstly to FIGURE 3, the top portion shows the value of frequency *f*1 and the values relative to it of the lower side band frequencies *f*1′ and *f*1″, etc., each of which represents a different lower side band frequency produced at the output of filter 12 with a different whole number value of *n* in frequency divider 13. The next portion down of FIGURE 3 shows the value of frequency *f*2 and the relative values *f*2′, *f*2″ etc., of different upper side band frequencies for different values of *n* in frequency divider 13. The lower portion of FIGURE 3 shows both frequencies *f*1 and *f*2 and both the relative upper and lower side band frequencies projected down from above. When the upper and lower side band frequency sets are shown together it will be noted that they are interleaved; as shown in the lower portion of FIGURE 3 they fall within a certain band width and in this band width they are relatively evenly spaced apart although each independent set has uneven spacings. The frequencies shown in the FIGURE 3 are the frequency values which appear at the output of the band pass filter 12, i.e. they represent the different values which can be given to the frequency F.

Referring now to FIGURE 4, there is shown the two frequency values *f*2′ and *f*2″, which are two values of frequency F, each having been divided by values $m_1$ and $m_2$ etc., each of which is a different integer value for *m*, to produce a number of sub-sets of frequencies. It will be seen that the frequency values of each sub-set are intermingled.

Similarly the frequencies F which depend upon frequency *f*1, for example *f*1′ and *f*1″ can be divided by different values of *m* to produce a number of sub-sets of frequencies. The frequencies in the various sub-sets of frequencies are possible values of the frequency $F_0$.

In the arrangement of the circuit of FIGURE 1, the switch S is an electronic switch and the digital frequency dividers 13 and 15 are separately controlled electronically so as to automatically and cyclically be set with different values for *n* and *m* by which the relevant frequency inputs thereto are divided. The relevant values for frequency *f*1 and *f*2 and for the integers *n* and *m* and the number thereof is determined, using the functions given hereinbefore, to provide a required number of different output frequencies, within an output band width, for a given frequency input. These values are arranged such that the intermingling as shown in FIGURES 3 and 4 is present. This arrangement produces a spectrum of available frequencies of approximately uniform density, within which the individual frequencies bear no apparent relationship to one another, whilst the spacing between the frequencies may vary over a considerable range (e.g. 10 to 1).

This type of circuit arrangement can be used, for example, in a communications system in which data is transmitted on a rapidly changing carrier frequency, both transmitter and the receiver frequencies being determined by identical, synchronised, digital code generators in order to maintain inviolability and/or secrecy for the communications.

The circuit arrangement provides switching from one frequency to another that is extremely fast, being in fact, determined only by the characteristics of the filters used, and is free running once it is started.

It should be appreciated that although the divider 15 has been shown positioned at the output of the circuit, it could in fact be positioned at the input of the circuit before the balanced modulator 12, as shown in dotted outline in FIGURE 1 and indicated by reference 15′. This gives the same required range of output frequencies but involves filtering problems which are not present with the system shown.

What we claim is:

1. A circuit arrangement for generating a random frequency spectrum within a range of frequencies, comprising a modulator, switch means, having two alternative conditions, for selectively applying one of first and second predetermined different frequencies to said modulator, the first frequency having an upper side band and the second frequency having a lower side band, which upper and lower side bands overlap each other, a band pass filter connected to the output from said modulator and having a pass band substantially coinciding with said overlapping upper and lower side bands, a feedback path from the output of said band pass filter to said modulator, and a frequency divider having a variable divisor in said feedback path, such that variation in the divisor of said frequency divider and changes in the condition of said switch means enable a random spectrum to be generated by said circuit arrangement within the pass band of said filter.

2. A circuit arrangement as claimed in claim 1 comprising a further frequency divider having a variable divisor connected to the output from said band pass filter, and means for deriving the output from said circuit arrangement from said further frequency divider.

3. A circuit arrangement as claimed in claim 1 comprising a further frequency divider having a variable divisor connected between said switch means and said modulator.

References Cited by the Examiner

UNITED STATES PATENTS

| | | | |
|---|---|---|---|
| 2,344,678 | 3/1944 | Crosby | 331—51 |
| 3,140,447 | 7/1964 | Olbrych et al. | 328—25 |

FOREIGN PATENTS

| | | |
|---|---|---|
| 130,574 | 12/1948 | Australia. |
| 526,367 | 9/1940 | Great Britain. |

ROY LAKE, *Primary Examiner.*

J. KOMINSKI, *Assistant Examiner.*